United States Patent [19]

Erickson

[11] Patent Number: 4,708,040
[45] Date of Patent: Nov. 24, 1987

[54] LOCK ROD AND APPARATUS FOR HOLDING A TOOLHOLDER

[75] Inventor: Robert A. Erickson, Raleigh, N.C.

[73] Assignees: Kennametal Inc., Latrobe, Pa.; Krupp Widia GmbH, Essen, Fed. Rep. of Germany

[21] Appl. No.: 7,169

[22] Filed: Jan. 27, 1987

[51] Int. Cl.[4] .................. B23B 29/04; B23B 29/34
[52] U.S. Cl. .................. 82/36 B; 82/36 R; 403/322; 409/233; 407/101
[58] Field of Search .......... 82/36 B, 36 R, 36 A; 409/232-234; 279/1 B; 403/322, 374; 408/238, 239 R, 239 A; 407/46, 101

[56] References Cited

U.S. PATENT DOCUMENTS

| 1,119,528 | 12/1914 | Nieman. | |
|---|---|---|---|
| 2,970,844 | 2/1961 | Better | 279/75 |
| 2,990,188 | 6/1961 | Better et al. | 279/75 |
| 3,115,798 | 12/1963 | Donaway | 82/34 |
| 3,498,653 | 3/1970 | McCreery et al. | 287/119 |
| 3,851,562 | 12/1974 | Tomita et al. | 20/11 A |
| 4,018,112 | 4/1977 | Heaton et al. | 82/1 C |
| 4,068,559 | 1/1978 | Schmid et al. | 90/11 D |
| 4,122,755 | 10/1978 | Johnson et al. | 90/11 A |
| 4,131,054 | 12/1978 | Johnson et al. | 90/11 |
| 4,135,418 | 1/1979 | McCray et al. | 82/36 A |
| 4,197,771 | 4/1980 | Heaton et al. | 82/36 B |
| 4,228,705 | 10/1980 | Heisner | 82/36 |
| 4,270,422 | 6/1981 | Andersson | 82/36 R |
| 4,292,866 | 10/1981 | Kaczynski | 82/36 R |
| 4,322,190 | 3/1982 | Anderson | 409/234 |
| 4,350,463 | 9/1982 | Friedline | 409/234 |
| 4,406,195 | 9/1983 | Kruger et al. | 82/36 |
| 4,573,824 | 3/1986 | Ehle | 403/322 |
| 4,575,293 | 3/1986 | Berti | 409/234 |
| 4,604,012 | 8/1986 | Kawasaki et al. | 409/233 |
| 4,643,472 | 2/1987 | Schukei et al. | 403/322 X |

FOREIGN PATENT DOCUMENTS

| 0061075 | 9/1982 | European Pat. Off. . | |
|---|---|---|---|
| 0123156 | 10/1984 | European Pat. Off. . | |
| 233321 | 2/1986 | German Democratic Rep. | 82/36 B |
| 1333872 | 10/1973 | United Kingdom . | |
| 1456611 | 11/1976 | United Kingdom . | |
| 2154479 | 9/1985 | United Kingdom . | |

Primary Examiner—Gil Weidenfeld
Assistant Examiner—Steven C. Bishop
Attorney, Agent, or Firm—John J. Prizzi

[57] ABSTRACT

A lock rod is provided extending along and reciprocally movable along an axis Y—Y and having a cylindrical cross section near one end. Two circumferentially spaced depressions are located in the cylindrical surface for receiving locking elements in an unlocked position. Extending from the first depression is a ramp inclined with respect to axis Y—Y and from the second depression is a groove parallel to axis Y—Y for driving locking elements radially outwardly to abut against a toolholder shank to lock it onto a tool support member.

9 Claims, 4 Drawing Figures

LOCK ROD AND APPARATUS FOR HOLDING A TOOLHOLDER

BACKGROUND OF THE INVENTION

The present invention relates to lock rods and locking mechanisms for releasably locking a toolholder onto a tool support member. It is especially concerned with those lock rods and locking mechanisms which use locking spheres to hold a toolholder and a support member together. Such articles are used in the cutting and shaping of workpieces where it is important that the toolholder be held on the tool support member by the locking mechanism in a rigid manner so that both movement and vibration are minimized during the metalcutting operation.

Many devices in the prior art have proven to be successful in this regard and are exemplified by McCreery U.S. Pat. No. 3,498,653; McCray et al U.S. Pat. No. 4,135,418; Heaton et al U.S. Pat. No. 4,197,771; and Friedline U.S. Pat. No. 4,350,463. The foregoing devices are concerned with the use of ball-like locking elements to hold the shank of a toolholder in the bore of the tool support member. In one prior art design, two ball-like locking elements were releasably driven outwardly to abut with the shank of a toolholder by two inclined ramps on a reciprocally movable lock rod.

However, there is always a need for improved toolholders, support members and locking members that provide a greater degree of rigidity during metalcutting operations such that a single assembly of toolholder, support member and locking mechanism can be used in the widest possible variety of machining operations to provide a given surface finish in a heavier cut or a finer surface finish for a given depth of cut and feed rate.

SUMMARY OF THE INVENTION

The present inventor has discovered an improved lock rod and apparatus utilizing that lock rod for holding a toolholder. In the present lock rod design, one of the inclined ramps in the prior art lock rod has been replaced by a groove extending parallel to the direction of reciprocal movement of the lock rod. The present lock rod design is a significant departure from the prior art designs utilizing two oppositely facing ramps inclined at equal angles. In the present invention, for a given included angle between the groove and ramp, an increased mechanical advantage is obtained with a shorter length of lock up stroke required compared to a two ramp design having the same included angle formed between the two ramps.

In the present design, a rod is provided having a first end and an oppositely facing second end which are joined by a side surface. The rod has a first and a second depression circumferentially spaced from the first depression in its side surface for receiving locking elements when in the unlocked position. A ramp having a concave cylindrical surface is provided in the side surface joining and extending away from the first depression in a first direction while receding away from the longitudinal central axis of the rod at an acute angle of no more than 20 degrees. A groove having a concave cylindrical surface is also provided in the side surface of the rod joining and extending away from the second depression in said first direction parallel to central axis of the rod. When locking a toolholder shank into the bore of a tool support member, the locking elements are driven and held radially outwardly by abutment with the ramp and groove of the lock rod.

The lock rod is preferably utilized in an apparatus for holding a hollow toolholder shank. The apparatus includes a tool support member having a forwardly facing surface and a bore intersecting the forwardly facing surface and extending rearwardly therefrom for receiving the tubular shank of a toolholder. The lock rod is retained within a stub member that is located within the support member bore and receivable in the tubular shank. The stub has a passageway therein in which the lock rod is loosely engaged and reciprocally movable. The stub member further includes a first and a second aperture circumferentially spaced from each other and radially extending away from the bore wall to intersect the passageway containing the lock rod. Located within the first and second apertures is a first and second locking element, respectively. The ramp and groove of the lock rod are circumferentially aligned with the first and second apertures so that movement of the rod in a first direction in the passageway acts to move and hold the locking elements in a locked position. Movement of the lock rod in the opposite direction after locking releases the force holding the locking elements against the toolholder shank allowing the locking elements to withdraw further into their apertures so that the toolholder may be removed.

BRIEF DESCRIPTION OF THE DRAWINGS

The foregoing and other aspects of the present invention will become more apparent upon review of the following detailed description of the invention in conjunction with the drawings which are briefly described below.

DETAILED DESCRIPTION OF THE INVENTION

Figure 1:
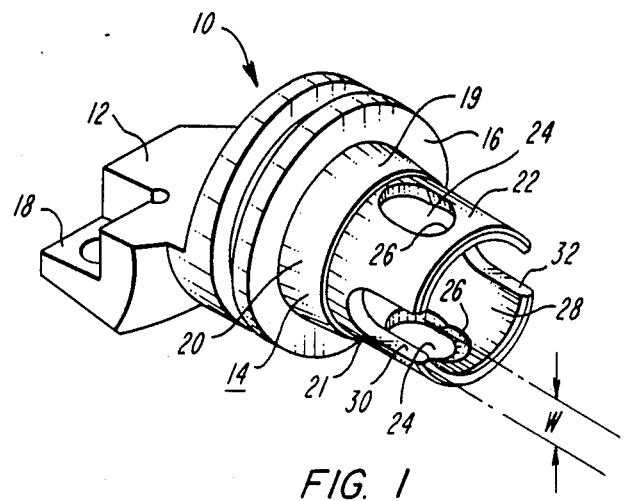
FIG. 1 shows a perspective view of a preferred embodiment of a toolholder for use with the present invention.

Shown in FIG. 1 is a preferred embodiment of a toolholder 10 for use with the present invention. The toolholder 10 has a forward end 12, a shank 14 joining the forward end 12 and a rearwardly facing abutment face 16 at the juncture of the forward end 12 and the shank 14.

The forward end 12 is conventional in nature and has a conventional tool receiving pocket 18 thereon for receiving a conventional shim, indexable cutting insert and locking pin (not shown).

The rearwardly facing abutment face 16 is designed for abutment with the forwardly facing surface of a tool support member on which the toolholder 10 is to be mounted. Rearwardly facing abutment face 16 is preferably planar in nature and preferably defines a plane that is perpendicular to the longitudinal axis of symmetry of the shank 14.

As shown in FIG. 1, the shank 14 is preferably an integral part of the toolholder 10, and is preferably machined from a single piece of steel. However, it is also contemplated that the shank 14 and the forward end 12 of the toolholder may be independent pieces that may be subsequently mechanically joined together with the rearwardly facing abutment face 16 being a part of either the forward end 12 or the shank 14. In this manner, a single shank may be utilized with a variety of different toolholder forward ends or other tool components.

The shank 14 is at least partially and preferably totally tubular in nature. The outer surfaces of the shank 14 may be divided into two sections. The first section 19 has a first surface of revolution 20 about the longitudinal axis of symmetry which faces radially outwardly and tapers inwardly while extending rearwardly. As shown in this figure, preferably this first surface of revolution is conical in nature.

Rearwardly of and joined to the first section of the shank 14 is a second section 21 which is tubular in nature. The second section has an outer surface which is a second surface of revolution 22 located rearwardly and inwardly of the first surface of revolution 20. The second surface of revolution 22 is preferably coaxial with the first surface of revolution 20 and is preferably cylindrical.

The tubular wall of the second section 21 of the shank is perforated by a first and a second perforation 24 which are circumferentially spaced from each other, preferably at 180 degrees to each other. The first and second perforations 24 respectively contain a first and a second forwardly facing concave abutment surface 26 which extend forwardly while extending radially away from the inner surface 28 of the shank. On large diameter shanks, there may be three or four circumferentially spaced perforations 24.

Preferably, circumferentially spaced between perforations 24 are slots 30 and 32 on the end of the tubular shank 14 and which interrupt the second surface of revolution 22. These slots 30 and 32 are designed to serve as keyways to accept keys in the tool support member bore. In addition, by locating the slots at the rear end of the tubular shank, the flexibility of the portion of the shank behind the perforations can be readily controlled by changes in the location, size and number of slots. In the preferred embodiment shown in FIG. 1, only slot 30 located in line with the cutting tool receiving pocket 18 is utilized as a keyway to hold the toolholder nonrotatably insofar as the width, w, of slot 30 is dimensioned to provide a slip fit with a key whereas the width of slot 32 is slightly larger (e.g., 0.010 inches greater) than the width of slot 30. This provides the added benefit that the tubular shank can be readily received in a tool support bore provided with two keys in order to accept both right handed and left handed toolholders (i.e., cutting tool pocket on the left or right hand side of the toolholder).

Figure 2:
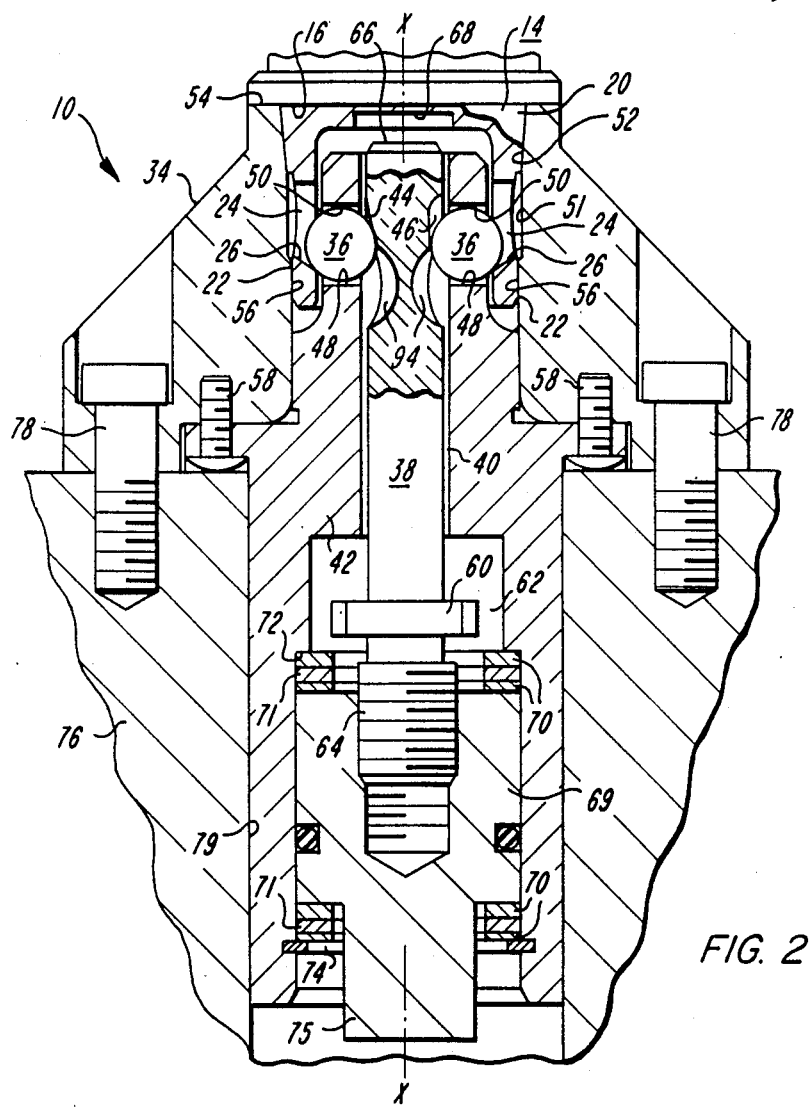
FIG. 2 shows a side plan view of an embodiment of a lock rod and apparatus in accordance with the present invention in partial cross section.

Now referring to FIG. 2 in accordance with the present invention, the toolholder 10 is resiliently mounted (i.e., locked up) on a tool support member 34 via locking elements 36. These locking elements 36 preferably are two spherical balls (i.e., spheres) which are held partially within the perforations 24 by a locking rod 38 nonrotatably contained within a longitudinal cylindrical passageway 40 in stub 42. The combination of locking elements 36, locking rod 38 and stub 42 form the locking mechanism. As shown in the figure, the diameter of the locking rod 38 is less than the diameter of the longitudinal passageway 40 to allow the locking rod 38 to be self-centering during lock up. The locking rod 38 has a concave cylindrical abutment ramp 44 and groove 46 which drive the spheres 36 outwardly through radial cylindrical apertures 48 in stub 42 when the locking rod 38 is pulled and held rearwardly as shown in FIG. 2. When the locking rod 38 is pushed forwardly to release the toolholder, spheres 36 are receivable in depressions 94 to allow the toolholder to be removed.

During locking, as the locking balls are moved outwardly by ramp 44 and groove 46, they are driven into abutment with the forwardly facing concave abutment surfaces 26 in perforations 24 and rearwardly facing concave surfaces 50 in the radial apertures 48 of the stub 42. In this manner, a force having both a rearward and a radially outward component is directed against the shank 14 of the toolholder 10 which has been inserted into the bore 51 of the tool support member 34. The rearward component of this force forces the first surface of revolution 20 into an interference fit with the bore's forward surface of revolution 52 about longitudinal axis X—X. The forward surface of revolution 52 faces radially inwardly and tapers radially inwardly while extending rearwardly and as shown in the figure is preferably conical and tapers inwardly at the same angle as found on the first surface of revolution 20 of the shank.

As the shank's first surface of revolution 20 and the bore's forward surface, of revolution 52 are being resiliently interference fit together, the rearwardly facing face 16 of the toolholder is being forced into abutment with the forwardly facing surface 54 of the tool support member 34.

The radially outward component of the force directed against shank 14 resiliently expands at least a portion of the second surface of revolution 22, preferably located rearwardly of the first and second forwardly facing concave abutment surfaces 26, into abutment with the bore's radially inwardly facing rear surface of revolution 56 about the longitudinal axis X—X. This bore surface 56 is preferably concave cylindrical to assure more complete abutment with the convex cylindrical surface 22 of the shank. Preferably, the diameter of the bore surface 56 is about 0.002 to 0.004 inches greater than the outer diameter of the second surface of revolution 22 in its unexpanded state. This loose fit also allows the present invention to be more easily utilized in robotic applications since the toolholder shank may be more easily inserted into the support member bore.

As shown in FIG. 2, the stub 42 is engaged in the bore of the tool support member 34 and held stationary by four bolts 58 (only two of which are shown) connecting it to the tool support member 34. The lock rod 38 and the locking elements 36 are loosely engaged in the stub longitudinal passageway 40 and radial apertures 48 respectively so as to be self-centering during locking. In the absence of a toolholder shank, the locking elements are loosely retained in their respective apertures by the lock rod 38 and the bore 51. The outside diameter of the stub 42 at its radial apertures 48 has been selected such that the difference between it and the diameter of the support member bore is small enough to assure that any locking element sticking out of a radial aperture 48 will be pushed into the aperture by the rearmost end of shank 14 as it is inserted into the bore and over the stub.

The lock rod 38 is held nonrotatably in longitudinal passageway 40 by the engagement of a key in a keyway, here shown as an oblong lug 60 on the lock rod in oblong recess 62 in the stub 42. At the rearward end of lock rod 38 is a threaded member 64 for engagement with conventional means for reciprocally moving and holding the locking rod 38 rearwardly for locking a shank 14 onto the tool support member 34, and forwardly for unlocking the shank 14 and then pushing shank 14 forwardly off the tool support member 34 via the abutment of forward abutment surface 66 on the lock rod and the shank push off surface 68 inside of the tubular portion of the shank 14.

The example of a conventional means for reciprocally moving shown in FIG. 2 is a torque nut unit consisting of a torque nut 69 threadedly engaged to threaded member 64 of the lock rod 38 and rotatively held within the rear end of the stub 42 between sets of thrust washers 70 having a thrust needle roller bearing 71 between them. The entire torque nut unit is retained axially stationary between a rearwardly facing annular shoulder 72 and a retaining ring 74. The rearmost end 75 of the torque nut 69 may then be engaged with a conventional power driven rotatable member to rotate the torque nut and thereby move lock rod 38 forward or rearward. Alternatively, conventional springs may be used in place of the torque nut unit for reciprocal movement of the lock rod.

As shown in FIG. 2, the tool support member may be held on a larger conventional machine or base member 76 which may be, for example, a turret, spindle or boring bar, etc., by fastening means such as four bolts 78 (only two of which are shown). Machine member 76 has a cylindrical bore 79 for receiving the rear end of stub 42.

While not shown, tool support member 34 preferably further contains two cylindrical keys extending into its bore at 180 degrees to each other and at 90 degrees to perforations 24. These keys are conventional in design and engage the keyway slots 30 and 32 in the end of shank 14, but do not contact stub 42.

Figure 3:
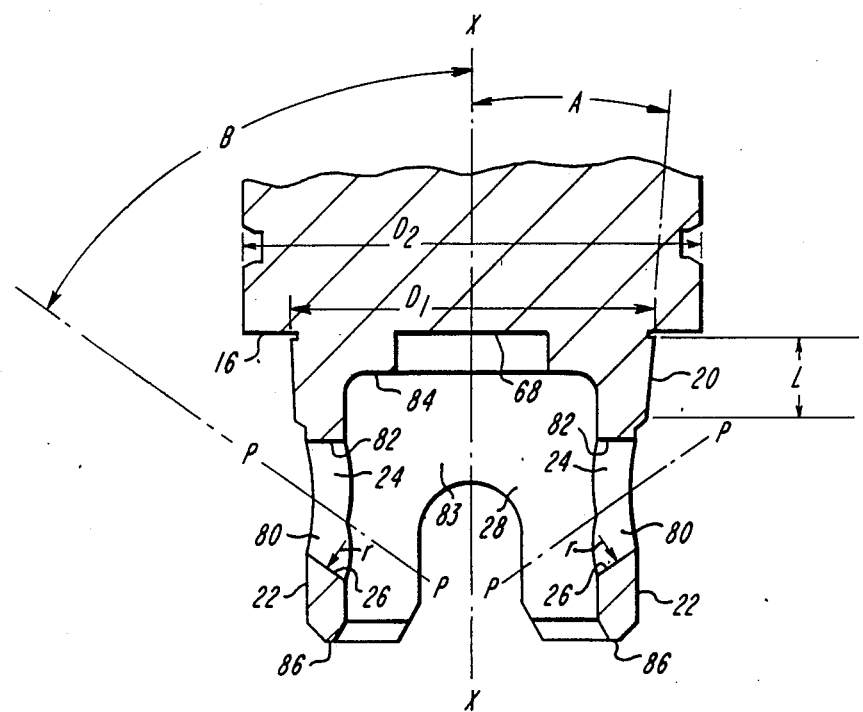
FIG. 3 shows a longitudinal cross section along a diameter of the toolholder shank shown in FIG. 1.

In FIG. 3, which is a cross section taken through the tubular shank 14 along a plane containing a shank diameter and the center lines P—P of abutment surfaces 26, it is clearly shown that abutment surfaces 26 preferably form walls 80 that are concave cylindrical in shape and have a radius of curvature r. These walls 80 are angled with respect to the longitudinal center line X—X of the shank at an angle B such that the rotational axis of symmetry P—P, and more importantly, forwardly facing concave abutment surfaces 26 on walls 80 extend forwardly while extending away from the inner surface 28 toward the outer surface 22 of the tubular shank 14. While it would be preferred that angle B is as large as possible to maximize mechanical advantage, at large angles, machining tolerances may interfere with the proper locating of the locking elements 36 against surfaces 26. It is, therefore, preferred that angle B is 50 to 60 degrees, and more preferably 55 degrees.

Concave forwardly facing abutment surfaces 26 have a radius of curvature r, the value of which is determined by the radius of curvature, $r_s$, of the convex abutment surface of the locking elements 36 which will abut against surfaces 26. It is preferred that r and $r_s$ be as close as possible to each other so that, when the locking elements 36 are abutted against surfaces 26, contact occurs over as large an area as possible in order to minimize deformation to the surface 26 and to the locking element surface, thereby prolonging their useful lifetimes. Preferably, in order to achieve this result, it is preferred that r is equal to, but no greater than, 0.004 inches, and more preferably 0.002 inches, larger than $r_s$.

It is important that the abutment surfaces 26 have the radius and slope described. It is also important that abutment surfaces 26 be at the same height in a direction parallel to the X—X axis to assure lockup occurs in both abutment surfaces. However, the other portions of the perforation walls that are not used for abutment with the locking elements may deviate from the above described relationships without affecting the performance of the present invention. For example, as shown in FIG. 3, the upper portion 82 of perforation walls extends radially outwardly from inner surface 28 to outer surface 22 so as to avoid the intersection of the perforations 24 with the first surface of revolution 20. If perforation 24 were to intersect the first surface of revolution 20, the corner formed thereby may damage the support member bore which is interference fit against it, unless a clearance is provided in the support member bore at that location.

The first surface of revolution 20 is preferably conical as shown. The angle, A, that surface 20 makes with the longitudinal center line X—X of the shank is preferably between 1 and 5 degrees (and 2A is preferably between 2 and 10 degrees) to provide a self-sticking taper when engaged with the similarly tapered bore of the tool support member. More preferably, 2A is a Morse taper (i.e., 5 degrees, 43 minutes and 30 seconds).

The first surface of revolution 20 has been dimensioned to provide an interference fit with the forward tapered section in the bore of the tool support member. We have found that in hardened and tempered steels (e.g., AISI 4340 or its equivalent having a hardness of Rockwell C 40-45 for the toolholder shank and Rockwell C 50-55 for the support member bore) that in an unstressed state (i.e., not mounted in the tool support member) that the first surface of revolution should radially extend beyond the forward surface of revolution by at least 0.0005 inches (on a diameter) in order to obtain the benefits of the present invention. Preferably, for the aforementioned materials, the unstressed extension of the first surface of revolution should be no greater than 0.0015 inches to assure avoidance of plastic deformation, and/or fatigue damage, to the toolholder or the tool support member. In addition, a maximum 0.0015 inches has been selected to assure that the shank can be readily removed from the tool support member bore. It should, however, be readily apparent to those of ordinary skill that these values have been selected for the size of toolholder ($D_1$=30 mm, $D_2$=40 mm, L=6 mm and 2A=Morse taper) and the materials described above to provide a desired range of contact stresses. In differing sizes or styles of toolholder, or toolholders and/or support members made of different materials, values outside of the range 0.0005 to 0.0015 inches may be appropriate to achieve equivalent results in terms of rigidity.

In addition to providing improved rigidity to the toolholder and support member assembly, the use of the interference fit as described herein also allows the tolerances on the diameter of the toolholder shank to be rather loose (e.g., ±0.0006 inch on a diameter) while still being assured of accurate centering and radial location and accurate longitudinal location through abutment between the rearwardly facing abutment face 16 on the toolholder and the forwardly facing surface 54 of the tool support member. Due to these loose tolerances, fabrication costs are also reduced.

As shown in FIG. 3, the second surface of revolution 22 is preferably a cylindrical surface, especially in those areas located rearwardly of forwardly facing concave abutment walls 26 insofar as we have found that cylindrical surfaces 22 can be expanded during lock up to provide larger areas of abutment with the cylindrical rear surface of revolution 56 in the tool support member 34 bore, compared to complementary conical surfaces. As much surface contact as possible is preferred in that it provides enhanced rigidity to the toolholder.

An internal cavity 83 is formed in shank 14 by inner generally cylindrical surface 28 which is joined by rearwardly facing surfaces 84 and 68 at the forward end of the tubular shank. The cavity 83 has been sized to loosely accept the lock up mechanism shown in FIG. 2. At their rearmost ends, surfaces 28 and 22 are joined by tapering members 86. The tapering members 86 serve to ease loading of the shank 14 over stub 42 and into the bore of the tool support member 34, while also helping to push locking elements 36 into the stub during loading.

Figure 4:
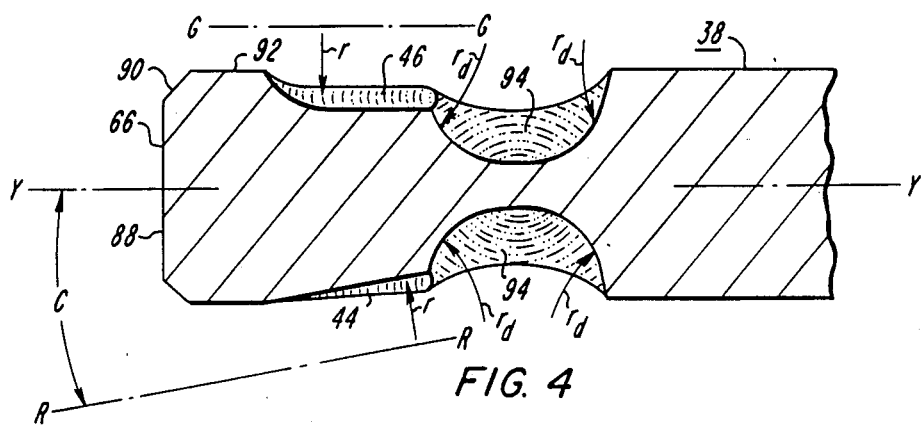
FIG. 4 shows an enlarged diametric longitudinal cross section of the forward end of the locking rod shown in FIG. 2.

Shown in FIG. 4 in accordance with the present invention is an enlarged diametric cross sectional view of the forward member of the lock rod 38 shown in FIG. 2. The forward end 88 of the lock rod has a flat abutment surface 66 joined at its periphery by an annular chamfer 90. The forward end 88 is joined at the outermost edge of chamfer 90 by a cylindrical side surface 92 which extends rearwardly away from forward end 88 about its central axis of rotational symmetry Y—Y which intersects abutment surface 66 at 90 degrees. Side surface 92 is intersected by a first and a second depression 94 which are circumferentially spaced from each other, and preferably, as shown in the figure, are at 180 degrees to each other and equidistant from plane of abutment surface 66. These depressions 94 have been dimensioned to receive locking elements 36 in the unlocked position. The depressions 94 as shown are elongated in the direction of the longitudinal axis Y—Y and preferably have a concave spherical surface at each longitudinal end with a radius $r_d$ that is equal to or slightly larger than the radius of the locking element 36. The radial depth of depressions 94 into cylindrical side surface 92 is set so that the sum of the thickness of lock rod material separating depressions 94 plus the two diameters of the locking elements 36 is less than the internal diameter of the shank.

Joining the first depression 94 at its longitudinal end closest to abutment surface 66 is a ramp 44. Ramp 44 extends away from the first depression toward abutment surface 66 while receding radially outwardly from central axis Y—Y. The surface of ramp 44 is a concave cylindrical surface of revolution having a radius r about axis R—R which is inclined to axis Y—Y at angle C. Radius r is preferably equal to or slightly larger than the radius of the locking elements 36 and is preferably no greater than 0.004 inches, and more preferably 0.002 inches, larger than the radius of the locking elements 36.

While angle C should ideally be as small as possible to maximize mechanical advantage, this ideal configuration must be balanced against the ability to manufacture within a given tolerance and the concern that the shallower C is the longer the stroke required to achieve lock up and the longer the lock rod must be. I have found that setting angle C equal to 20 degrees to be a preferred compromise between these competing concerns, with angle C being equal to 15 degrees being more preferred.

Now joining the second depression 94 is a groove 46 rather than a ramp identical to ramp 44 as is found in prior art lock rod designs. Groove 46 joins the second depression at its longitudinal end closest to abutment surface 66 and extends away from the second depression toward abutment surface 66 parallel to central axis Y—Y. The surface of groove 46 is a concave cylindrical surface of revolution also having a radius r, but about axis G—G which is parallel to axis Y—Y.

By pulling the lock rod rearwardly, locking elements roll out of depressions 94 and onto groove 46 and ramp 44 which drive the locking elements radially outwardly to lock the toolholder onto the support member. When subsequently the lock rod is moved forwardly, the locking elements 36 roll into depressions 94 allowing the second surface of revolution 22 to collapse out of abutment with the bore's rear surface of revolution 56, thus unlocking the tool. Where the first surface of revolution 20 is a self-sticking taper, the lock rod may be advanced further forward so that the lock rod abutment surface 66 abuts against push off surface 68 within the tubular shank to release the toolholder from the tool support member.

The present lock rod design utilizing a groove and a ramp is a significant departure from prior art designs utilizing two oppositely facing ramps inclined at equal angles and provides significant advantages thereover. For a given included angle (here the angle between axis R—R and axis G—G) the present design provides an increased mechanical advantage with a shorter lock up stroke required compared to a two ramp design having the same included angle formed between the two ramps.

While all components utilized herein are preferably made from hardened and tempered steels, it will be clear to those of ordinary skill in the art that other materials may be substituted without detracting from the performance of the present invention. For example, while the locking elements 36 are preferably made of a chromium alloy steel having a Rockwell C hardness of 60-65, it is also contemplated that they may be made of cemented carbide. The stub 42 may be made of AISI 4340 steel or its equivalent having a Rockwell C hardness of 40-45. While the lock rod 38 may preferably be made of an alloy steel such as AISI 4340, it is more preferably made of a shock resisting tool steel, such as AISI S7 having a Rockwell C hardness of about 56-58.

Additional embodiments of locking rods, locking mechanisms and support members for use with the toolholders described herein are found in R. A. Erickson copending applications Serial Nos. 007309 and 007310 filed on the same date as the present application. These applications, as well as all previously referred to patents, are hereby incorporated by reference in their entireties.

Changes and modifications in the specifically described embodiments can be carried out without departing from the scope of the invention which is intended to be limited only by the scope of the appended claims.

What is claimed is:

1. An article of manufacture comprising:
   a rod having a first end and an oppositely facing second end, said first and second ends joined by a side surface, and a central axis Y—Y extending between said first and second ends;
   a first depression in said side surface;
   a ramp in said side surface having a concave cylindrical surface joining and extending away from said first depression in a first direction while receding from axis Y—Y at an acute angle of no more than 20 degrees;

a second depression in said side surface circumferentially spaced from said first depression;

a groove in said side surface having a concave cylindrical surface joining and extending away from said second depression in said first direction parallel to axis Y—Y.

2. The article of manufacture according to claim 1 further comprising:

means for holding said rod nonrotatable about axis Y—Y.

3. The article of manufacture according to claim 1 further comprising:

means for attaching said rod to another member.

4. The article of manufacture according to claim 1 wherein said acute angle is between 15 and 20 degrees.

5. An apparatus for holding a tubular toolholder shank, said apparatus comprising:

a tool support member having a forwardly facing surface and a bore intersecting said forwardly facing surface and extending rearwardly therefrom for receiving said shank;

a means for locking said toolholder shank into said tool support member;

said means for locking having a stub member having a passageway therein and a reciprocally movable element loosely engaged in said passageway;

said stub member located within said bore and receivable in said tubular toolholder shank;

said stub member having a first aperture and a second aperture circumferentially spaced from said first aperture;

said first and said second apertures radially extending away from the bore wall and intersecting said passageway;

a first locking element and a second locking element for releasable abutment with said hollow toolholder shank respectively located in said first and said second apertures;

a ramp and a groove for moving and releasably holding said locking elements against said hollow toolholder shank;

said ramp and said groove located on said reciprocally movable element, said groove extending parallel to a direction of the reciprocal movement of said reciprocally movable element, and said ramp and said groove respectively circumferentially aligned with said first and second apertures.

6. The apparatus according to claim 5 wherein said first and said second locking elements are spheres and said ramp and said groove having a concave cylindrical surface for abutment with said spheres.

7. The apparatus according to claim 6 wherein the radius of curvature of said concave cylindrical surface is equal to, but no greater than, 0.004 inches larger than the radii of curvature of said first and said second locking elements.

8. The apparatus according to claim 7 wherein the radius of curvature of said concave cylindrical surface is equal to, but no greater than, 0.002 inches larger than the radii of curvature of said first and second locking elements.

9. The apparatus according to claim 5 wherein said first and said second locking elements are respectively retained within said first and second apertures by said reciprocally movable element and said bore wall.

* * * * *